(12) United States Patent
Choi (10) Patent No.: US 10,726,077 B1
(45) Date of Patent: Jul. 28, 2020

(54) SERVER SIDE CONTENT PAGE RE-RENDERING

(71) Applicant: Nativo, Inc., El Segundo, CA (US)

(72) Inventor: Justin Yoo Choi, Newport Coast, CA (US)

(73) Assignee: Nativo, Inc., El Segundo, CA (US)

( * ) Notice: Subject to any disclaimer, the term of this patent is extended or adjusted under 35 U.S.C. 154(b) by 430 days.

(21) Appl. No.: 15/425,801

(22) Filed: Feb. 6, 2017

Related U.S. Application Data (60) Provisional application No. 62/292,123, filed on Feb. 5, 2016.

(51) Int. Cl.
| | |
|---|---|
| *G06F 16/951* | (2019.01) |
| *G06F 16/40* | (2019.01) |
| *G06F 16/80* | (2019.01) |
| *G06F 16/93* | (2019.01) |
| *G06F 16/901* | (2019.01) |
| *G06F 16/957* | (2019.01) |

(52) U.S. Cl.
CPC ............ *G06F 16/951* (2019.01); *G06F 16/40* (2019.01); *G06F 16/80* (2019.01); *G06F 16/9027* (2019.01); *G06F 16/93* (2019.01); *G06F 16/9577* (2019.01)

(58) Field of Classification Search
CPC ........ G06F 16/951; G06F 16/40; G06F 16/93; G06F 16/80; G06F 16/9577; G06F 16/9027
USPC ........................................... 707/770
See application file for complete search history.

(56) References Cited

U.S. PATENT DOCUMENTS

| | | | | |
|---|---|---|---|---|
| 2010/0299431 | A1* | 11/2010 | Vanderhook | G06Q 30/02 709/224 |
| 2012/0324043 | A1* | 12/2012 | Burkard | H04L 67/16 709/217 |
| 2013/0007260 | A1* | 1/2013 | Jain | G06F 16/9574 709/224 |
| 2013/0191360 | A1* | 7/2013 | Burkard | G06F 17/2247 707/706 |
| 2017/0148058 | A1* | 5/2017 | Chauhan | G06Q 30/0258 |

* cited by examiner

*Primary Examiner* — Joshua Bullock
(74) *Attorney, Agent, or Firm* — Van Pelt, Yi & James LLP (57) ABSTRACT

An identifier is received from a server associated with a content provider. An at least partially pre-rendered page that corresponds to the requested page is generated. The at least partially pre-rendered page includes a content element associated with a content provider and at least one third party element. The at least partially pre-rendered page is provided to the server.

19 Claims, 9 Drawing Sheets

SERVER SIDE CONTENT PAGE RE-RENDERING

CROSS REFERENCE TO OTHER APPLICATIONS

This application claims priority to U.S. Provisional Patent Application No. 62/292,123 entitled SERVER SIDE CONTENT PAGE RE-RENDERING filed Feb. 5, 2016, which is incorporated herein by reference for all purposes.

BACKGROUND OF THE INVENTION

Figure 1:
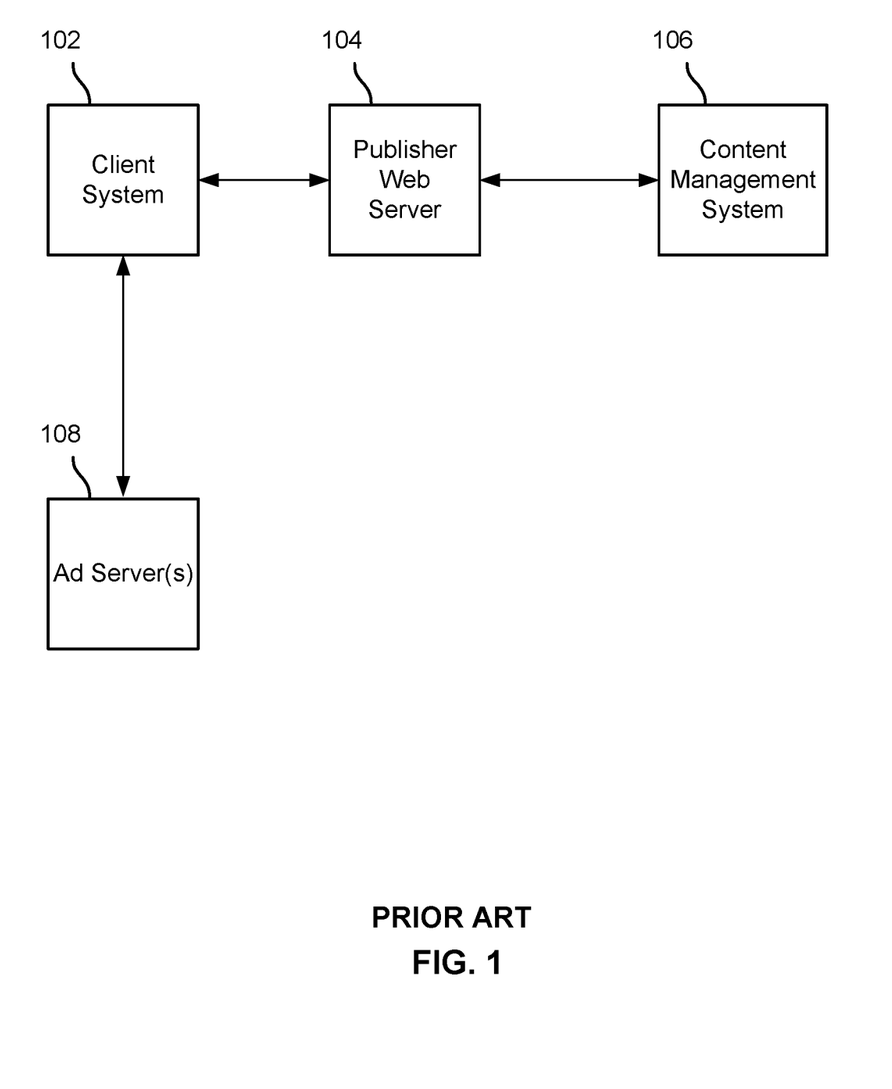
FIG. 1 shows a typical prior art approach in which a publisher page includes Javascript™ or other code that dynamically calls out to ad servers from the client device at which the publisher page is being rendered.

In typical current approaches, to display a page with one or more ads, a page is loaded which has JavaScript which calls the ad server(s). FIG. 1 shows a typical prior art approach in which a publisher page includes Javascript™ or other code that dynamically calls out to ad servers from the client at which the publisher page is being rendered. The client system 102 requests a page from publisher web server 104, which obtains content from a content management system 106 to build and serve the requested page. The page includes multiple pieces of JavaScript or other code to call out one or more ad server(s) 108 to obtain ads (or other external content) to be displayed in predetermined locations in the publisher page as rendered at client system 102.

The prior approach can result in less satisfactory user experience, since most pages have numerous ad calls, ads may take a long time to load, add download data costs to mobile users, and slow down the performance of the page, and/or may by interfered with ad blocking or other software. This can decrease the amount of user engagement with a page and the number of pages viewed per user.

The usage of ad blocking tools by users to prevent ads from loading by blocking dynamic JavaScript ad calls is becoming increasingly more common. These ad blockers work by stopping all JavaScript calls to servers that are known to serve ads. This hurts the business of publishers since they cannot monetize that visitor because an ad that does not load means that an ad impression fee cannot be charged to the advertiser.

It would be useful to have a system that reduces the amount of time needed to load ads and prevents an ad-blocker from blocking the ads.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques to load a page faster and to ensure publishers get credit for providing an advertisement are disclosed.

Publishers could re-code their entire site to optimize for speed as well as remove any third party ad providers that aren't judicious with response latency and ad file sizes to improve the page load times. Although this can reduce the stress on users that drive them to install ad blockers, there is already enough momentum behind ad blockers that their usage is expected to continue to increase even if publishers address some of the issues that cause users to install them.

Users use ad blocking tools not only to avoid ads, but also to decrease the amount of time required to load a page. Because the ad blocking tools are blocking JavaScript calls that are often slow and prevent the loading of ad assets such as images and videos that can be large in size, the web pages load much faster for the user and on mobile devices and the user uses less of their data plan on loading ads reducing costs to the consumer.

Publishers need a technology solution to prevent ad blocking on their site(s). They also need a simpler solution for getting their sites to load faster—the engineering effort needed to recode their sites is a great hurdle for them to overcome as they have limited engineering capabilities and resource bandwidth. Finally, removing third parties that introduce excessive latency and increase load times can be difficult as publishers often work with a large number of third parties and currently have no easy way to monitor providers to see which are slowing down their sites. Publishers need a way to fire third party ad verification tags, which are JavaScript based, required by advertisers to verify proper delivery of ads and share data. These ad tags are blocked by ad blockers.

To load a page faster and ensure publishers get credit for providing an advertisement, a publisher page is analyzed to determine one or more tags associated with an ad content provider, one or more tags associated with a third party verification provider, and content associated with a content management system. A fully or partially pre-rendered version of the publisher page that includes publisher content and third party content can be generated. Code to produce content associated with the one or more tags of the publisher page is obtained and incorporated into a page in place of the one or more tags to generate a pre-rendered page. The pre-rendered page can be generated in real time in response to a request for a publisher page or retrieved from a database storing a plurality of pre-rendered pages.

The pre-rendered page is provided to the client in place of the publisher page that would normally be loaded. The pre-rendered page retains the layout of the publisher page, but because it includes site code (e.g. html code) for the content from the one or more ad providers instead of dynamic calls to one or more ad providers, the page is able to load faster. Upon providing a pre-rendered page to the publisher web server, the content included in the pre-rendered page is determined and a third party notification service associated with the content is notified.

Figure 2:
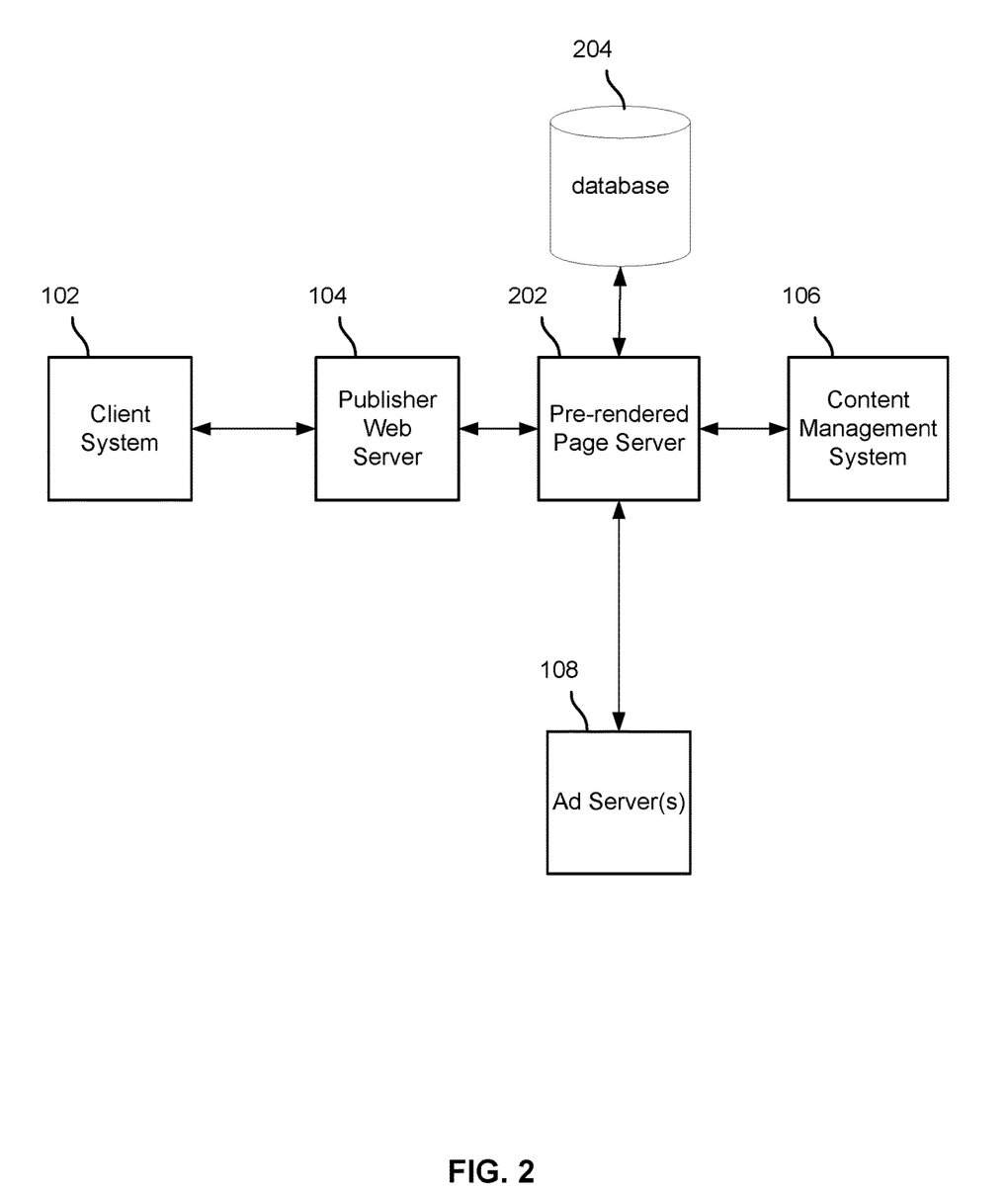
FIG. 2 illustrates an example of a system for generating and providing pre-rendered pages in accordance with some embodiments.

FIG. 2 illustrates an example of a system for generating and providing pre-rendered pages in accordance with some embodiments.

In the example shown, client system 102 is connected via a network to publisher web server 104 and is configured to request for content (e.g., a webpage, url, web address) from publisher web server 104. Client system 102 includes a web browser or other client application that is accessible by a user of client system 102. Examples of client system 102 include a computer, a laptop, a desktop, a tablet, a mobile device, a PDA, or any other device that operates a web browser or client application. The network comprises one or more of the following: a local area network, a wide area network, a wireless network, the Internet, an intranet, or any other appropriate communication network.

Publisher web server 104 hosts a website. Publisher web server 104 is configured to receive a request for content from a device, such as client device 104. Publisher web server 104 is configured to send a request for a publisher page (i.e., a page of the website) to pre-rendered page server 202. Publisher web server 104 is also configured to receive from pre-rendered page server 202 a pre-rendered page that is based on the requested publisher page. Publisher web server 104 may be implemented using one or more computing devices, such as a computer, a multi-processor system, a microprocessor-based system, a special purpose device, a distributed computing environment including any of the foregoing systems or devices, or other appropriate hardware/software/firmware combination that includes one or more processors and memory coupled to processors and configured to provide the processors with instructions.

Pre-rendered page server 202 is configured to generate a fully or partially pre-rendered page for a publisher web server and to store the pre-rendered page in database 204. The generated page can include ad content from one or more ad servers 108. Rather than a page being sent to client system 102 that includes code to call the one or more ad servers 108 dynamically from client system 102, the ad content is retrieved by pre-rendered page server 202 from one or more ad servers 108 and incorporated (e.g., stitched) into the page prior to the page being provided to publisher web server 104 to be served to client system 102. In some embodiments, the generated page can be built ahead of time or at the time the request for the publisher page is processed by pre-rendered page server 202.

The generated pages can be built using content elements obtained from content management system 106 and/or one or more ad servers 108. In some embodiments, up to thousands or even millions of page combinations can be pre-generated. In some embodiments, past traffic data can be analyzed to pre-generate a plurality of possible variations of a page for a plurality of possible targeted users prior to any users coming to the site and requesting the page. As each user requests for content from the publisher site, i.e., requests a webpage, the pre-generated page appropriate for the user may be served instantly based at least in part on an IP address associated with the user's client device, location data associated with the user's client device, a time of day, a device identifier associated with the user's client device, a cookie associated with the user's client device, and/or other targeting data used for advertising. In some embodiments, cache techniques, such as those used by Content Distribution Networks (CDN) to deliver web content, can be used to deliver the pre-generated pages as quickly as possible to the user's client device.

In some embodiments, multiple versions of the page with different image resolutions can be generated. For example, one version of a pre-rendered page may be a low resolution page that loads with low resolution images that load quickly and another version of a pre-rendered page may be a high resolution page that loads with high resolution images. In some embodiments, the low resolution page is replaced by a version of the page with higher resolution images. In some embodiments, the pre-rendered page is partially pre-rendered. A partially pre-rendered page may include place holders for the dynamically loaded elements of the page, such as ads, images, or videos. Partially pre-rendered pages may simply have place holders for the dynamically loaded elements of the page such as ads, images, or videos. In other embodiments, the pre-rendered page is fully pre-rendered.

In some embodiments, multiple versions of a page that enable AB testing can be generated. For example, pages that vary a combination of the location/position of ad content and/or publisher/editorial content publisher/editorial content on a page, the versions of ad content and/or publisher/editorial content, and/or the formatting of ad content and/or publisher/editorial content can be generated. In some embodiments, the variations are generated in a targeted fashion based on information associated with a client device and/or a user of the client device (e.g., gender, prior content consumed, previous behavior, profession, etc.). In some embodiments, a version of a page that matches the information associated with the client device and/or user of the client device is generated in real-time.

In some embodiments, the multiple versions of page are generated based on the performance of previous versions of pages. For example, a previous version of a page may have a particular amount of user engagement with a particular demographic. A page can be generated that is similar to the previous version (e.g., have the same combination of location/position of ad content and/or publisher/editorial content publisher/editorial content on a page, content version, formatting, etc.)

Database 204 may be part of pre-rendered page server 202 or coupled to pre-rendered page server 202 via a network. Pre-rendered page server 202 may be implemented using one or more computing devices, such as a computer, a multi-processor system, a microprocessor-based system, a special purpose device, a distributed computing environment including any of the foregoing systems or devices, or other appropriate hardware/software/firmware combination that includes one or more processors and memory coupled to processors and configured to provide the processors with instructions.

Content management system 106 is connected via a network to pre-rendered page server 202. In some embodiments, content management system 106 is configured to receive a request for content from pre-rendered page server 202 and to provide the requested content to pre-rendered page server 202. The content management system 106 is also configured to enable online publishers (content providers) to provide their content to the content management system. The content can be an article brief, article text, a publisher image, a publisher video file, a publisher audio file, etc. An article brief can include a headline, article preview text, author name, date, and a preview image. Content management system 106 may be implemented using one or more computing devices, such as a computer, a multi-processor system, a microprocessor-based system, a special purpose device, a distributed computing environment including any of the foregoing systems or devices, or other appropriate hardware/software/firmware combination that includes one or more processors and memory coupled to processors and configured to provide the processors with instructions.

One or more ad servers 108 are connected via a network to pre-rendered page server 202. In some embodiments, one or more ad servers 108 are configured to receive a request for content from pre-rendered page server 202. The content can include a banner advertisement, a native advertisement, sponsored content, native content, native sponsored content, and/or other advertising/sponsored content-related data/information. The content from the one or more ad servers 108 can include text, images, videos, headlines, and/or other information for inclusion in the content from the one or more ad servers 108. The request for content can be based on one or more tags associated with a publisher page. In some embodiments, one or more ad servers 108 are configured to provide code (e.g., html code) that produces the content to pre-rendered page server 202, which can generate a pre-rendered page with the code in place of a tag. For example, a publisher page includes one or more tags that when provided to a client system, will cause the client system to dynamically call one or more ad servers for content associated with the one or more tags. Instead, the pre-rendered page server can provide a pre-rendered page that includes code that produces the content in place of the one or more tags.

Ad servers 108 may be implemented using one or more computing devices, such as a computer, a multi-processor system, a microprocessor-based system, a special purpose device, a distributed computing environment including any of the foregoing systems or devices, or other appropriate hardware/software/firmware combination that includes one or more processors and memory coupled to processors and configured to provide the processors with instructions.

Figure 3:
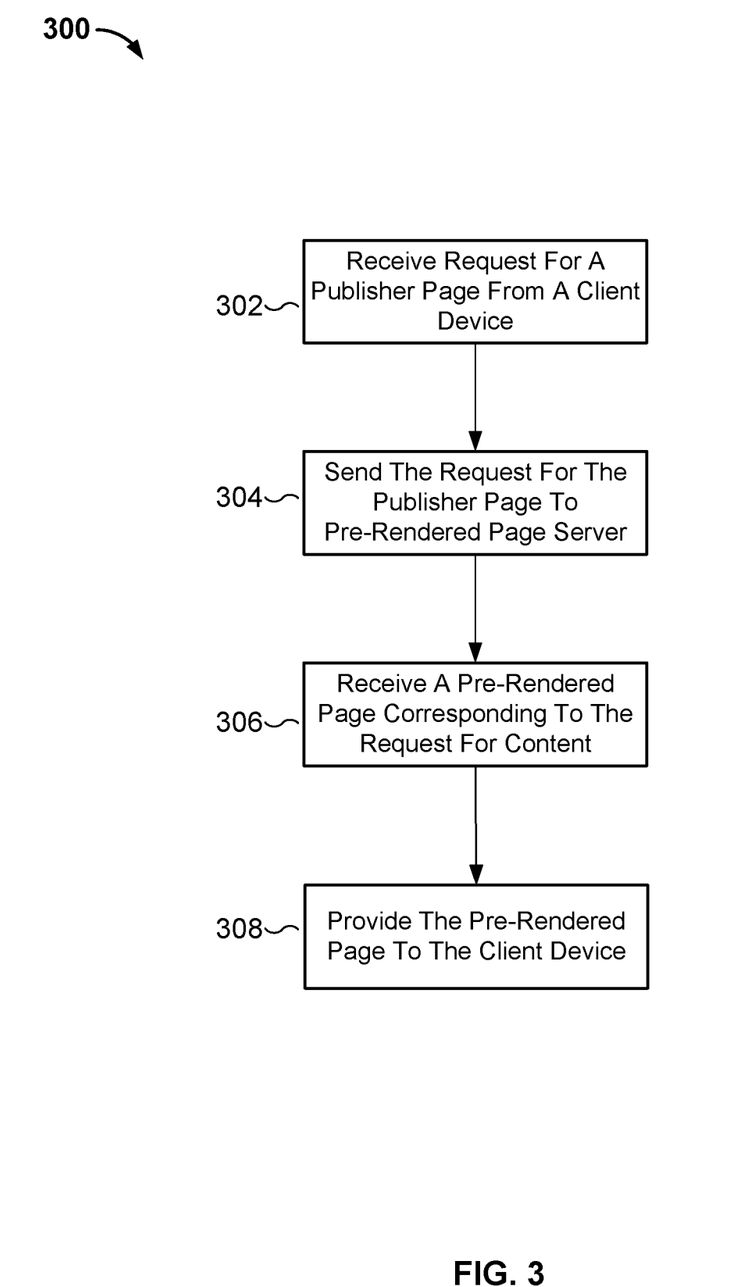
FIG. 3 illustrates an example of a flowchart for providing a pre-rendered page to a client in accordance with some embodiments.

FIG. 3 illustrates an example of a flowchart for providing a pre-rendered page to a client in accordance with some embodiments. In the example shown, process 300 can be implemented on a publisher web server, such as publisher web server 104.

At 302, a request for a publisher page is received from a client device. For example, a browser or application of a client device may receive a web address and the client device is configured to send a request for a page associated with the web address to a publisher web server. In other embodiments, a link displayed in the browser or application may be selected (e.g., by mouse or touchscreen).

At 304, the request for the publisher page is sent to a pre-rendered page server. In some embodiments, information associated with the client device is provided to the pre-rendered page server. Examples of information associated with a client device include an IP address associated with the client device, location data associated with the client device, a time of day, a device identifier (ID) associated with the client device, a client device type, and/or a cookie associated with the client device. For example, it may be determined that the client device has an iOS® operating system.

At 306, a pre-rendered page is received from the pre-rendered page server. Instead of having calls to dynamically include content from one or more ad servers, the pre-rendered page already includes the content from the one or more ad servers. This enables the page to load faster on the client device because the page includes little to no dynamic JavaScript calls. In some embodiments, the pre-rendered page is selected based on the client device type, e.g, iOS® vs. Android®.

At 308, the pre-rendered page (e.g., html file) is provided to the client device.

Figure 4:
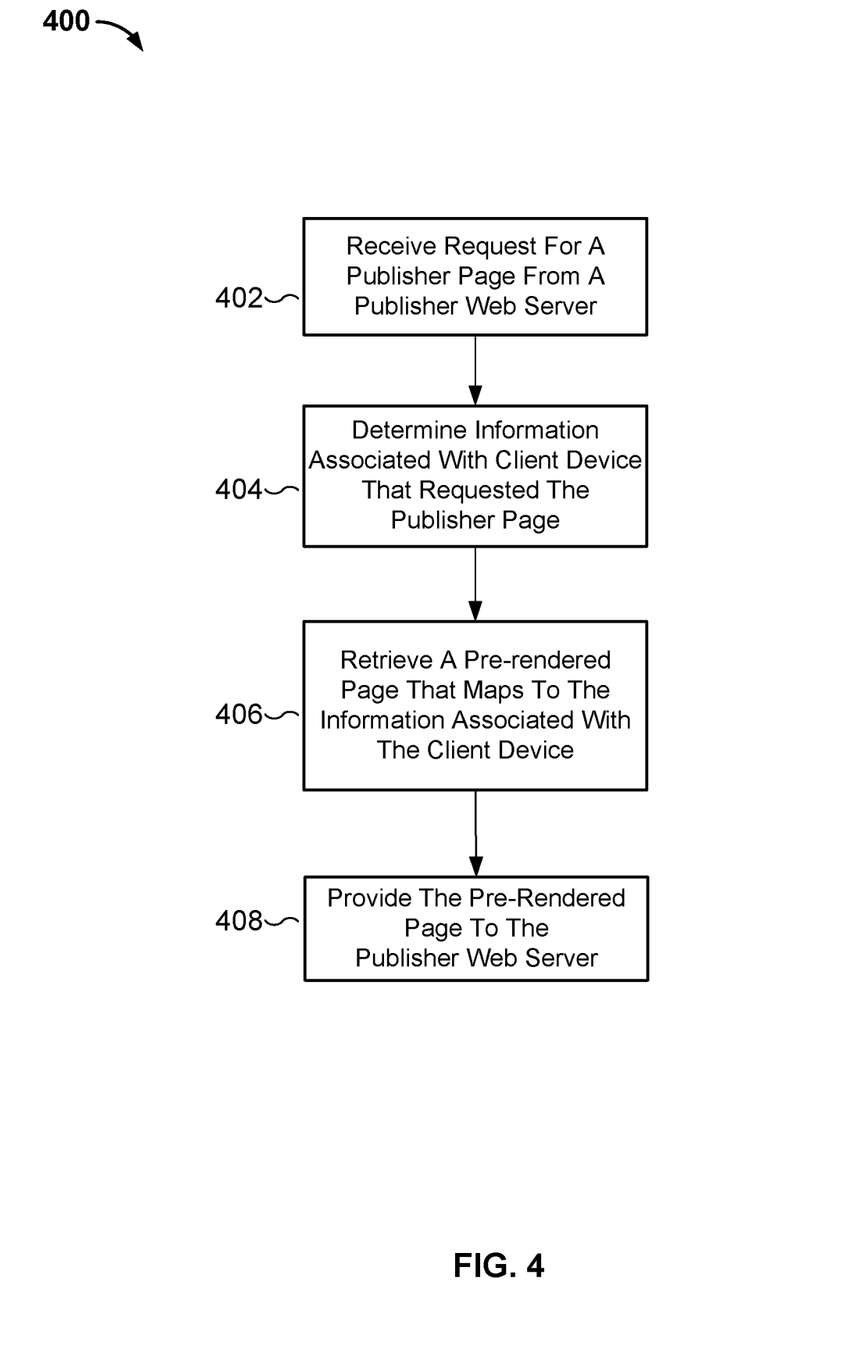
FIG. 4 illustrates an example of a flowchart for providing a pre-rendered page to a publisher web server in accordance with some embodiments.

FIG. 4 illustrates an example of a flowchart for providing a pre-rendered page to a publisher web server in accordance with some embodiments. In the example shown, process 400 can be implemented on a pre-rendered page server, such as pre-rendered page server 202.

At 402, a request for a publisher page is received from a publisher web server. The request can include information associated with the client device requesting the publisher page.

At 404, information associated with a client device that requested the publisher page is determined. Examples of information associated with a client device include an IP address associated with the client device, location data associated with the client device, a time of day, a device identifier (ID) associated with the client device, a client device type, and/or a cookie associated with the client device. For example, it may be determined that the client device has an iOS® operating system.

At 406, a pre-rendered page that maps to the information associated with the client device is retrieved from a database. Up to thousands or even millions of page combinations may be generated and stored at the database. A user associated with the client device may be determined to be part of a particular target group/demographic based on the information associated with the client device. The database may store different versions of a pre-rendered page. For example, a pre-rendered page of a publisher page can be generated for iOS® devices and a second pre-rendered page of the publisher page having the same publisher content can be generated for Android® devices. In some embodiments, a plurality of pre-rendered pages can be generated for a particular publisher page, such that each pre-rendered page is associated with a different target group/demographic.

At 408, the retrieved pre-rendered page (e.g., html file) is provided to the publisher web server.

Figure 5:
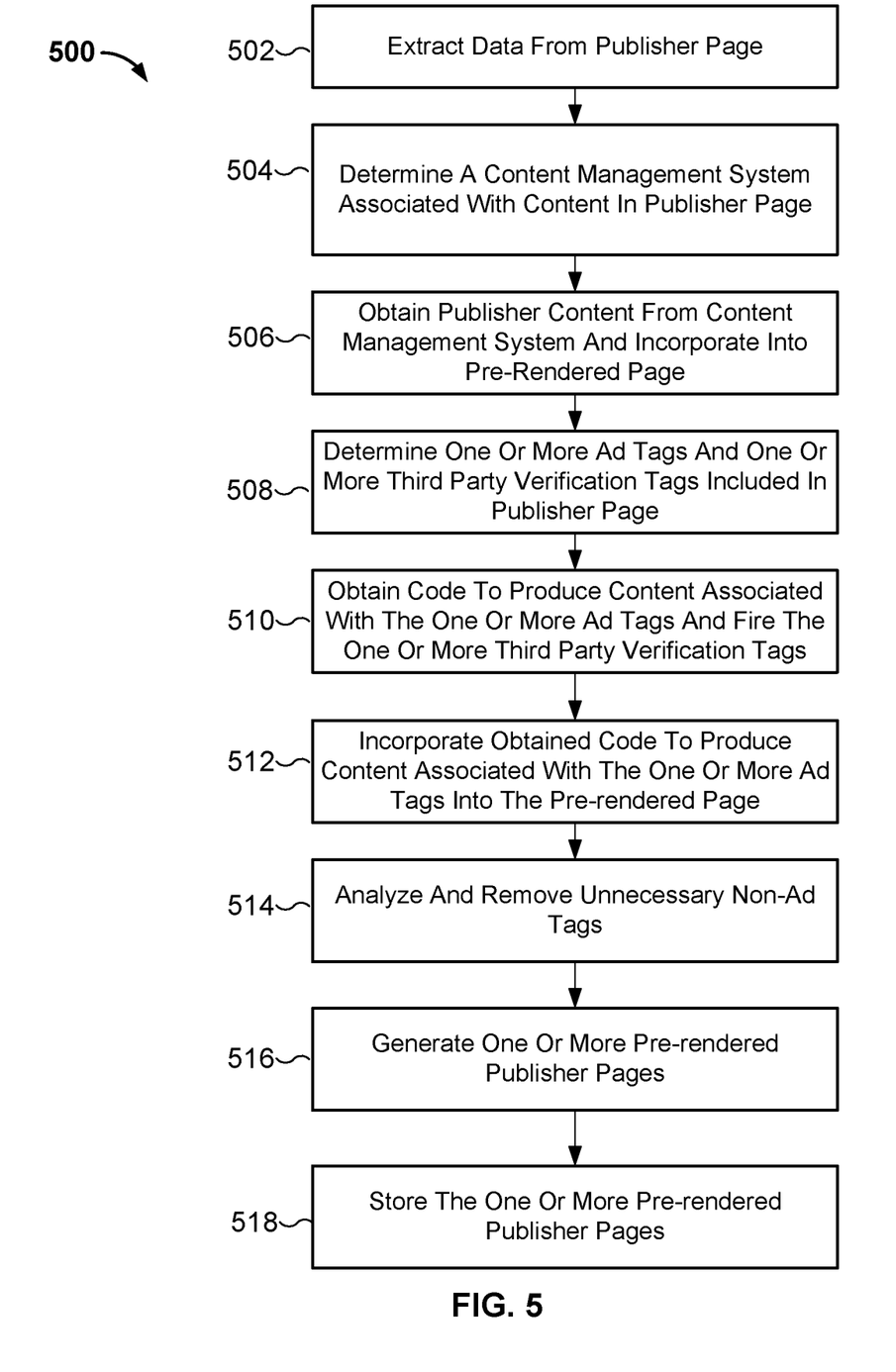
FIG. 5 illustrates an example of a flowchart for generating a pre-rendered page in accordance with some embodiments.

FIG. 5 illustrates an example of a flowchart for generating a pre-rendered page in accordance with some embodiments. In the example shown, process 500 can be implemented on a pre-rendered page server, such as pre-rendered page server 202.

At 502, data is extracted from a publisher page. The output of the publisher page is scrapped and ingested. In some embodiments, data is extracted from the publisher page using an API to extract data from a web site. The data can include one or more ad tags from one or more ad content providers, one or more third party verification tags associated with the one or more ad tags, one or more non ad tags, and publisher content. The one or more non ad tags (e.g. footer, device-specific tags, etc.) include JavaScript code.

In some embodiments, the publisher page was created using a publisher template page. The template page includes placeholders for one or more non ad tags, publisher content, and ad content. The publisher page includes JavaScript code in the placeholder for the one or more non ad tags and the placeholder for one or more ad content tags. In some embodiments, the publisher template page can be used to generate a pre-rendered publisher page.

At 504, one or more content management systems associated with content in the publisher page is determined based on the extracted data. Online publishers enter their content (e.g., article text) into a content management system. The content entered into a content management system is then rendered onto a publisher page that is served to a client device that visits the publisher's site.

At 506, publisher content included in a publisher page is obtained from the one or more content management systems and incorporated into a pre-rendered page. The obtained content includes the code to provide the publisher content that was included in the publisher page. The obtained content can include different versions of the publisher content. In some embodiments, a publisher template is used to generate a pre-rendered page. A version of the publisher content can be selected and incorporated into the template by inserting the code for the publisher content at a location of the template designated for publisher content. In some embodiments, a pre-rendered page can be generated for each version of the publisher content.

At 508, one or more ad tags and one or more third party verification tags included in the publisher page are determined. In most instances, a publisher page includes dynamic code, usually JavaScript, which renders dynamic elements, such as ads. These ads are dynamically rendered since they are often served by a third party platform (e.g., ad server) and often include some logic applied at run-time to determine which ad is served to that user. The ad that is served to the user may be based on geo-targeting information based on the IP address of the client device or a time of day. In some embodiments, a third party verification tag is embedded within an ad tag.

At 510, code to produce content associated with the one or more ad tags and fire the one or more third party verification tags is obtained. The obtained code can include code to produce the ad content associated with a tag included in the publisher page. In some embodiments, the obtained code includes code obtained from each ad provider server that included an ad tag in the publisher page. The obtained code can include code to fire a third party verification tag associated with an ad tag.

At 512, the obtained code to produce/create content associated with the one or more ad tags is incorporated into the pre-rendered page. For example, the obtained code can include code to create a native advertisement with content elements (header element, body text element, image, element, video element, etc.) layouts (e.g., position(s) of the native advertisement), patterns, formats, and attributes (e.g, text size(s), font(s), color(s), dimensions, position, appearance characteristics, and/or other attributes). In some embodiments, the publisher provides a template to receive native content from one or more ad providers. The template can be configured to include code to produce content associated with the one or more ad tags instead of providing an ad tag in the template. For example, the ad tag can be replaced with code to produce content associated with the ad tag.

At 514, one or more non ad tags of a template page are analyzed and removed from the template page used to generate the pre-rendered page. The one or more non ad tags are analyzed to determine if they are necessary to load the page and/or they increase the amount of time needed to load a page beyond a threshold. Tags that are determined to be unnecessary to load a page and/or increase the amount of time needed to load a page beyond a threshold can be included in a set of extra tags. For example, a publisher can provide a template to create a publisher page. The template includes one or more non ad tags that are rendered on a client device. These non-ad tags can increase the amount of time needed to load the page. Some of the non-ad tags are unnecessary for certain devices. For example, a template can include non-ad tags for a iOS® device, an Android®, and other mobile devices. A page created from the template and rendered by an Android® device would still fire the iOS® device tags even though they are not needed by the Android® device to render the page. The iOS® device tags can be removed from the template page used to generate a pre-rendered page for Android® devices. In some embodiments, other non-ad tags (e.g., footer) are removed from the template page.

At 516, one or more fully or partially pre-rendered pages are generated. In some embodiments, a pre-rendered page is generated using a template provided by a publisher. In some embodiments, different versions of a pre-rendered page having the same publisher content can be generated. For example, a first pre-rendered page can be generated for a device of a first type and a second pre-rendered page having the same publisher content can be generated for a device of a second type. Up to thousands, even millions of page combinations of a pre-rendered page may be generated At 518, the one or more pre-rendered pages are stored in a database. Each page is stored as a file that includes site code (e.g., html code) that enables the publisher content and ads (or other external content) to be provided to a client device on a single call.

Figure 6:
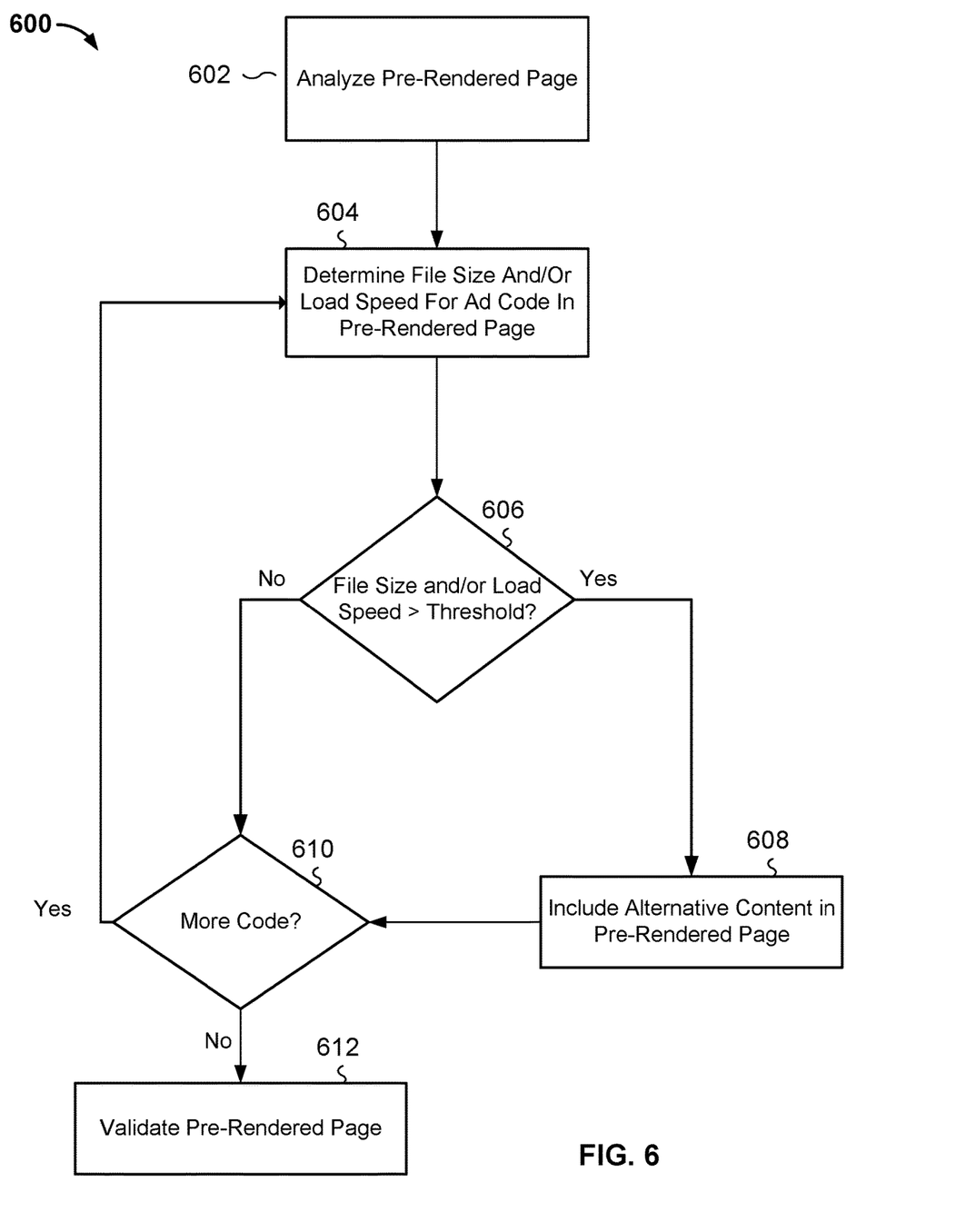
FIG. 6 illustrates an example of a flowchart for validating a pre-rendered page in accordance with some embodiments.

FIG. 6 illustrates an example of a flowchart for validating a pre-rendered page in accordance with some embodiments. In the example shown, process 600 can be implemented on a pre-rendered page server, such as pre-rendered page server 202.

At 602, a pre-rendered page is analyzed.

At 604, a file size and/or a load speed is determined for code associated with content provided from an ad provider that is included in the pre-rendered page.

At 606, it is determined whether the file size and/or the load speed of the code exceeds a file size threshold or load speed threshold. In the event the file size exceeds a file size threshold, the process proceeds to 610. In the event the file size does not exceed the file size threshold, the process proceeds to 608. In the event the load speed exceeds a load speed threshold, the process proceeds to 610. In the event the load speed does not exceed a load speed threshold, the process proceeds to 608.

At 608, alternative content is incorporated into the pre-rendered page in place of the content provided from the ad provider. In some embodiments, the alternative content includes a blank spot or placeholder image that is included in the pre-rendered page. In other embodiments, the alternative content includes a JavaScript call or code associated with an advertisement for the publisher is included in the pre-rendered page. In other embodiments, the alternative content includes a JavaScript call to an advertisement associated with a different ad provider. In other embodiments, the alternative content includes code associated with content from a different ad provider is included in the pre-rendered page. In some embodiments, the publisher provides a template publisher page to receive content from one or more ad providers. The template can be configured to include code to produce alternative content in place of the content provided from the ad provider.

At 610, it is determined whether the publisher page includes other portions of code associated with content provided from a different ad content provider. In the event there are more portions of code, the process proceeds to 604. In the event there are no more portions of code, the process proceeds to 612.

At 612, the pre-rendered page is validated and stored. In some embodiments, the pre-rendered page is stored on the publisher web server, the pre-rendered page server, or in a database.

Figure 7:
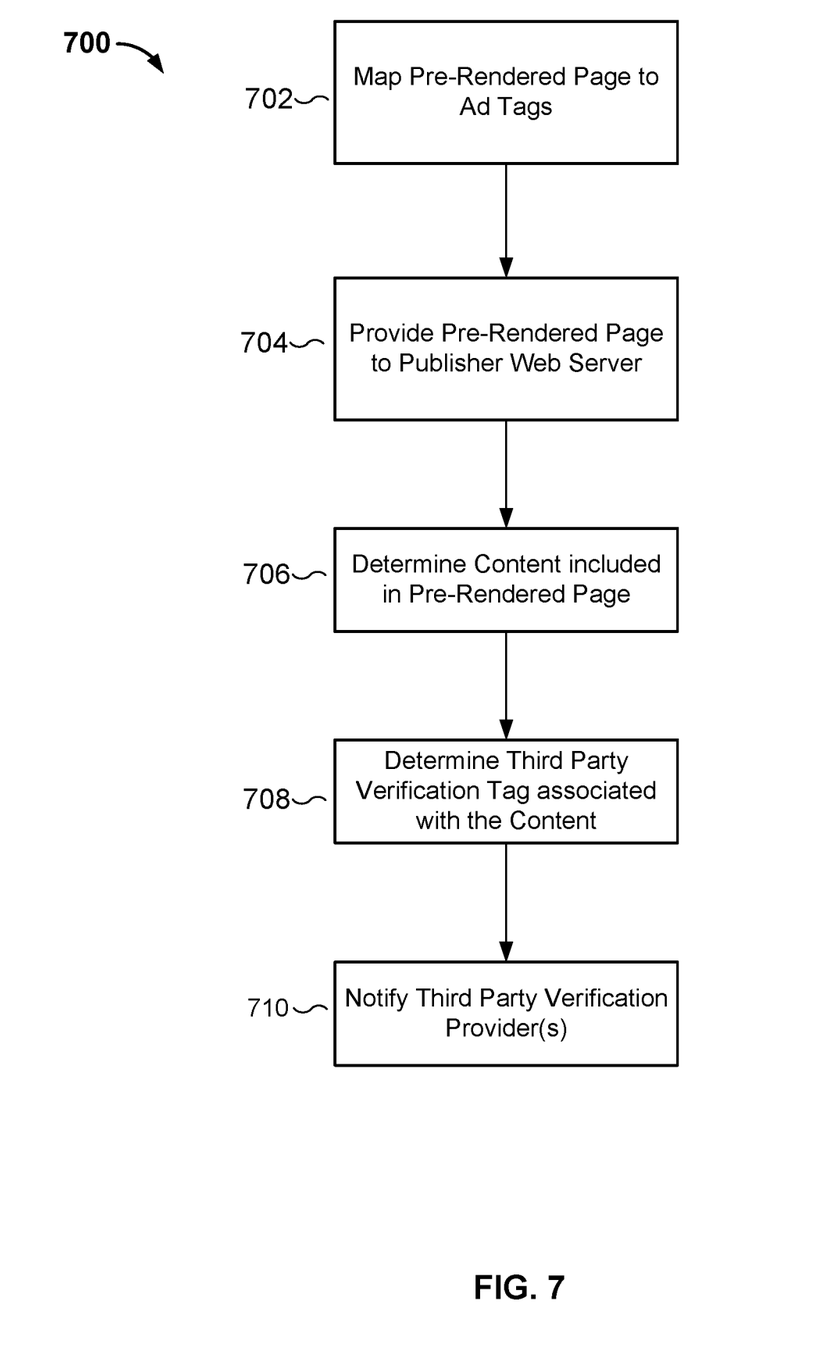
FIG. 7 illustrates an example of a flowchart for notifying a third party verification provider in accordance with some embodiments.

FIG. 7 illustrates an example of a flowchart for notifying a third party verification provider in accordance with some embodiments. In the example shown, process 700 can be implemented on a pre-rendered page server, such as pre-rendered page server 202.

Process 700 can be used to defeat ad blocking software that would normally prevent dynamic ad calls and also decrease page load speed and download sizes. This helps the client device to use less bandwidth (important on mobile devices with limited data plans) and to load the page faster. Some of the dynamic ad calls include calls to third party verification servers. Process 700 also allows publishers to get credit for providing an ad to a client device, which would be blocked.

At 702, each instance of code included in a pre-rendered page that generates content associated with an ad provider is mapped to one or more ad tags included in a publisher page. A publisher page includes one or more ad tags that when rendered on a client device, causes the client device to dynamically call for content associated with the one or more ad tags. The pre-rendered page includes code to render the content. In some instances, a publisher page will include a tag for content that is stored in an ad provider server and an associated third party verification tag that enables the publisher to get credit for providing an advertisement for the ad provider. In some instances, the third party verification tag is embedded within an ad tag. The third party verification tag, when rendered on a client device, causes the client device to notify a third party verification provider. In some embodiments, an instance of code included in a pre-rendered page that generates content associated with an ad provider is mapped to a tag for content that is stored in an ad provider server and an associated verification tag that enables the publisher to get credit for providing an advertisement for the ad provider.

A record that maps each instance of code included in a pre-rendered page that generates content associated with an ad provider to one or more ad tags included in a publisher page is maintained and stored in a database. For example, if an instance of code in a pre-rendered page maps an ad tag to content provider A and a third party verification tag to third party verification provider B, the record is configured to store the relationship between the instance of code, the ad tag, content provider A, the third party verification tag, and the third party verification provider B.

At 704, a pre-rendered page is provided to a publisher web server. The pre-rendered page can include pre-generated code associated with content provided from one or more ad servers (e.g., native advertisement, sponsored content, promoted content, advertising content) and content provided from one or more content management systems (headlines, images, embedded videos, article brief(s), article text, etc.).

At 706, content included in the pre-rendered page that is provided from one or more ad servers is determined. For example, a pre-rendered page is analyzed to determine that it includes pre-generated code associated with content provided from a particular ad server.

At 708, one or more third party verification tags associated with the content is determined. The record that stores the relationships between the code included in the pre-rendered page, the ad tag, the content provider, the third party verification tag, and the third party verification provider is inspected.

At 710, one or more third party verification providers associated with the determined one or more third party verification tags are notified. The pre-rendered page server is configured to fire the one or more third party verification tags and to send the verification data to the associated one or more third party verification providers. In various embodiments, content that is served is indexed so that publishers can later view them to see which content providers ran which content on their sites.

Figure 8:
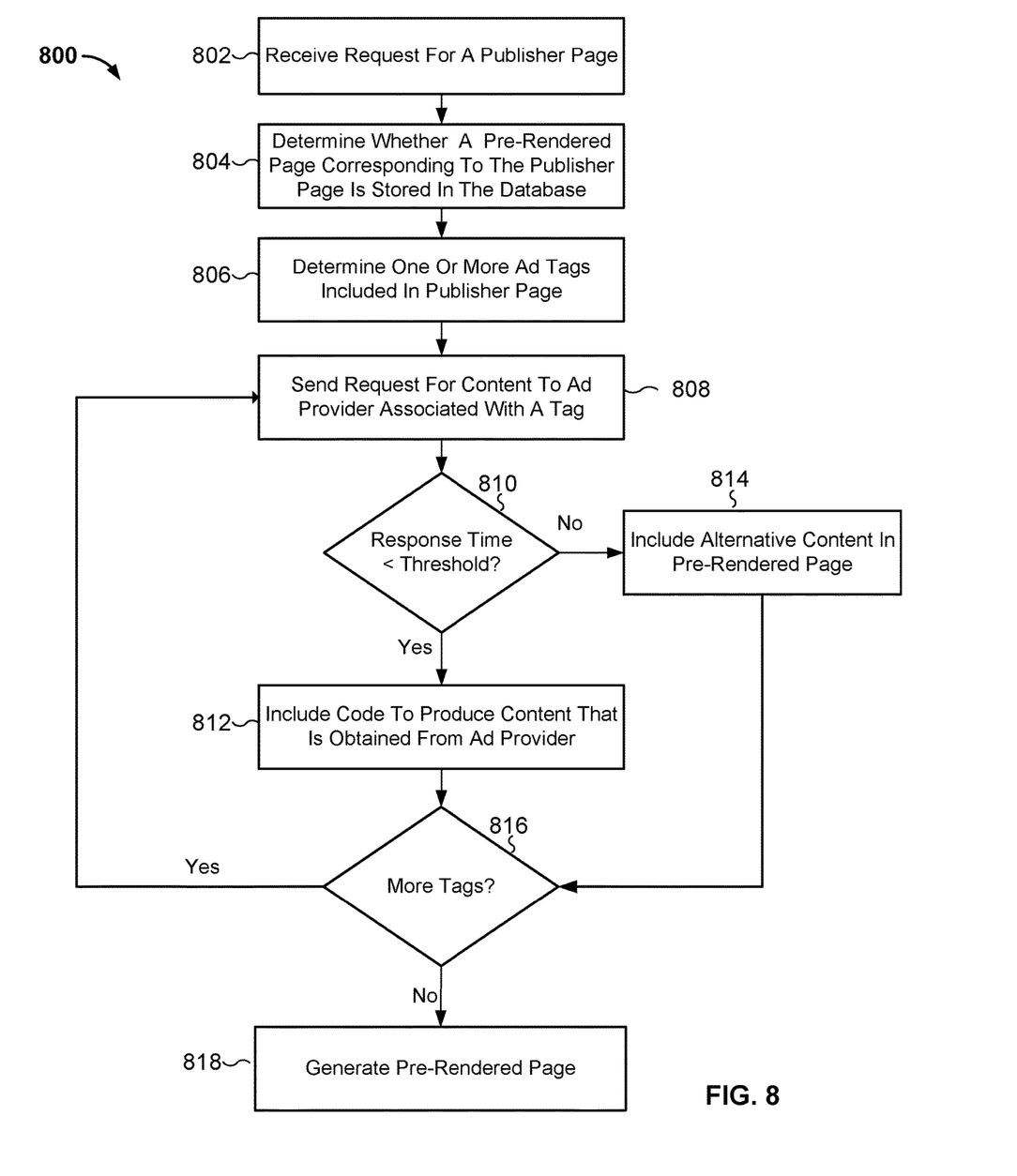
FIG. 8 illustrates an example of a flowchart for generating a pre-rendered page in real time in accordance with some embodiments.

FIG. 8 illustrates an example of a flowchart for generating a pre-rendered page in real time in accordance with some embodiments. In the example shown, process 800 can be implemented on a pre-rendered page server, such as pre-rendered page server 202. In some instances, a publisher web server will receive from a client device a request for a publisher page that does not have a corresponding pre-rendered page stored in a database associated with the pre-rendered page server. The pre-rendered page server is configured to generate a fully or partially pre-rendered page that includes some or none of the dynamic ad calls included in the publisher page. In some embodiments, process 800 can also include some or all of the steps of process 500.

At 802, a request for a publisher page is received. For example, the request can be an identifier associated with the publisher page (e.g., URL). At 804, it is determined whether a pre-rendered page corresponding to the publisher page is stored in the database. In the event the pre-rendered page is stored in the database, then the pre-rendered page is retrieved from the database. In the event a pre-rendered page corresponding to the publisher page is not stored in the database, then then process proceeds to 806. At 806, one or more ad tags included in the publisher page are determined.

In some embodiments, steps 806-816 can be used to perform some or all of step 508. At 808, a request for content is sent to an ad provider associated with an ad tag included in the publisher page.

At 810, it is determined whether a response time from the ad provider is less than a response time threshold. In the event the response time is less than a response time threshold, the process proceeds to 812. In the event the response time is not less than a response time threshold, then the process proceeds to 814.

At 812, code to produce the content associated with the tag that is obtained from the ad provider is included in the pre-rendered page. For example, the tag can be replaced with code to produce the content associated with the tag.

At 814, alternative content is incorporated into the pre-rendered page in place of the tag. In some embodiments, a blank spot is included in the pre-rendered page. In other embodiments, code associated with an advertisement for the publisher is included in the pre-rendered page. In other embodiments, code to produce content from a different ad content provider is included in the pre-rendered page. In other embodiments, a JavaScript call to obtain content from the different ad content provider is included in the pre-rendered page. In some embodiments, the publisher provides a template publisher page to receive native content from one or more ad providers. The template can be configured to include code to produce content associated with the one or more tags instead of providing a tag in the template.

At 816, it is determined whether the publisher page includes any more tags. In the event the publisher page includes more tags, the process proceeds to 808. In the event the publisher page does not include more tags, the process proceeds to 818. At 818, the pre-rendered page is generated. The pre-rendered page can be a fully pre-rendered page or a partially pre-rendered page.

Figure 9:
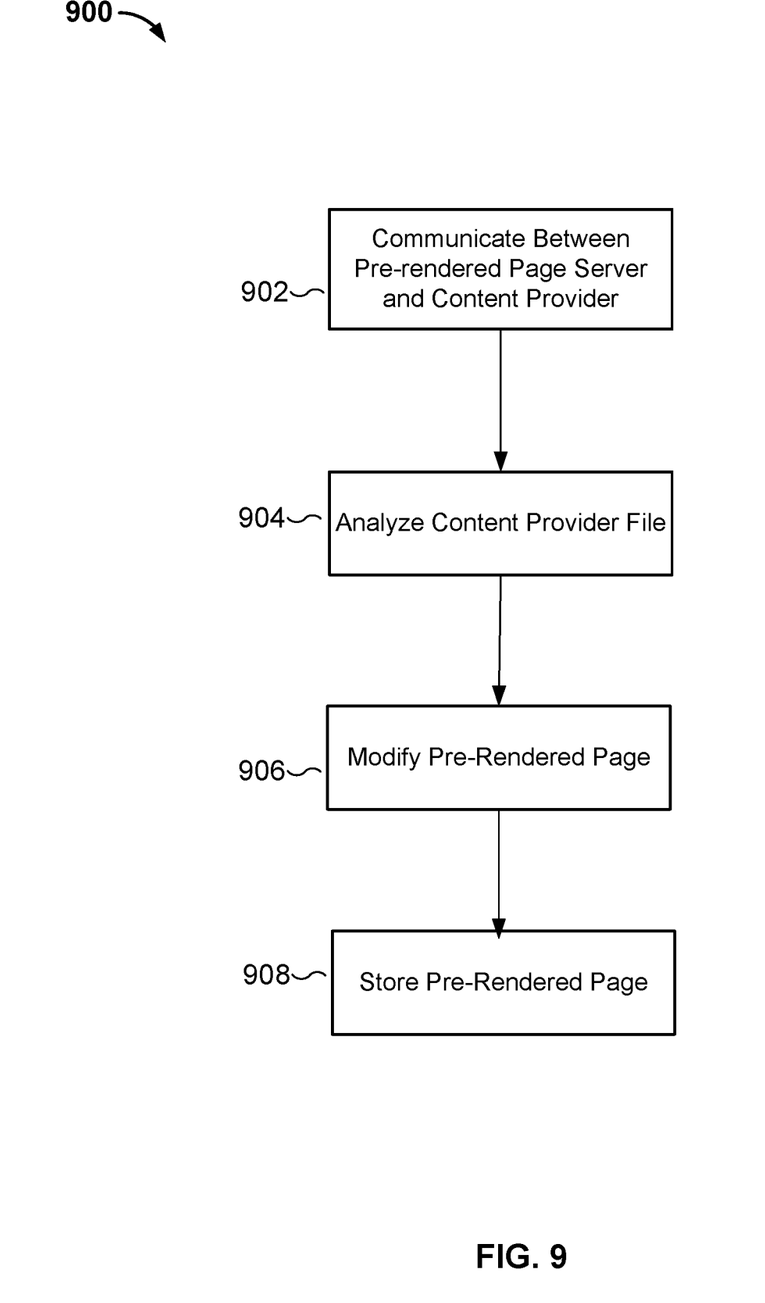
FIG. 9 illustrates an example of a flowchart for updating a pre-rendered page in real time in accordance with some embodiments.

FIG. 9 illustrates an example of a flowchart for updating a pre-rendered page in real time in accordance with some embodiments. In the example shown, process 800 can be implemented on a pre-rendered page server, such as pre-rendered page server 202.

In some embodiments, pages are pre-rendered prior to a client device requesting for a publisher page from a publisher web server, such that ads cannot be loaded dynamically. However, dynamic targeting is an important advertising tactic for major advertisers.

At 902, a communication occurs between a pre-rendered page server and a content provider, such as an ad server or a content management system. In some embodiments, the pre-rendered page server is configured to send a communication to an ad server requesting information regarding whether content associated with the ad server needs to be updated. In response to the communication, the ad server is configured to send a content provider file that notifies the pre-rendered page server of one or more changes to the content associated with the ad server. In other embodiments, the ad server is configured to periodically transmit the content provider file to the pre-rendered page server. In other embodiments, the ad server is configured to transmit the content provider file to the pre-rendered page server whenever content associated with the ad server is updated.

In other embodiments, the pre-rendered page server is configured monitor the publisher's page for changes and editorial content added via the content management system associated with a publisher. The pre-rendered page server is further configured to re-render the publisher's page based on the changes and added editorial content.

At 904, a content provider file is analyzed. In some embodiments, the content provider file includes an indication that one or more changes to the content associated with the ad server has occurred. For example, the content provider file may include an indication that an image associated with native content has changed. In some embodiments, the content provider file includes the one or more changes to the content associated with the ad server. For example, if an image associated with native content has changed, then the content provider file will include the new image file.

In some embodiments, the content provider file includes an indication that new content is available for various targeting parameters, e.g., various demographic or other audience segments. For example, the content provider file can indicate that changes to native content are to be applied to some instances of a pre-rendered page, but not other instances of a pre-rendered page. For example, the content provider file may indicate that the text of the content associated with the ad server should be modified and only shown to client devices at a particular location while the text of the content associated with the ad server should be unchanged for client devices at a different location.

At 906, the pre-rendered page is modified based on the content provider file. For example, if an image associated with native content has changed, then the code associated with the pre-rendered page is modified such that the new image associated with the native content will be rendered in place of the previous image associated with the native content. In some embodiments, multiple modified versions of a pre-rendered page are created based on the content provider.

At 908, the modified pre-rendered page is stored in a database. In some embodiments, the modified pre-rendered page and the pre-rendered page subject to the modification described in the content provider file are stored in the database. In other embodiments, the modified pre-rendered page is stored in the database, but the pre-rendered page subject to the modification described in the content provider file is removed from the database.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a network interface configured to receive an identifier from a server associated with a content provider;
a processor coupled to the network interface and configured to:
generate a plurality of at least partially pre-rendered pages that correspond to the identifier, wherein each of the plurality of the at least partially pre-rendered pages is associated with a corresponding target demographic, wherein the at least partially pre-rendered pages include a corresponding content element associated with the content provider and at least one third party element, wherein the at least partially pre-rendered pages incorporate corresponding code to produce content associated with the at least one third party element in place of one or more tags associated with the at least one third party element and
provide one of the at least partially pre-rendered pages corresponding to the target demographic associated with a client device to the server, wherein the one of the at least partially pre-rendered pages is configured to incorporate code to produce content associated with the at least one third party for the target demographic associated with the client device.

2. The system of claim 1, wherein the processor is configured to generate the plurality of at least partially pre-rendered pages in response to receiving the identifier.

3. The system of claim 1, wherein the processor is configured to generate the plurality of at least partially pre-rendered pages at least in part by retrieving the plurality of at least partially pre-rendered pages from a database.

4. The system of claim 1, further comprising a database storing the plurality of at least partially pre-rendered pages for a plurality of content providers.

5. The system of claim 1, wherein the server is configured to receive the identifier from the client device and in response to the receiving the identifier, the server is configured to send the identifier to the system.

6. The system of claim 1, wherein the identifier is a URL associated with the content provider.

7. The system of claim 1, wherein the processor is further configured to:
   determine the one or more tags included in a page associated with the identifier;
   obtain code to produce content associated with the one or more tags; and
   incorporate the code to produce content associated with the one or more tags into a template associated with the page to generate one of the plurality of at least partially pre-rendered pages.

8. The system of claim 1, wherein the processor is further configured to:
   determine the one or more tags included in a page associated with the identifier, wherein the one or more tags include one or more JavaScript-based calls to one or more remote servers;
   obtain code to produce content associated with the one or more tags; and
   incorporate the code to produce content associated with the one or more tags into a template associated with the page to generate one of the plurality of at least partially pre-rendered pages.

9. The system of claim 1, wherein the processor is further configured to:
   determine the one or more tags included in a page associated with the identifier, wherein the one or more tags include one or more JavaScript-based calls to one or more remote servers, wherein one of the remote servers is a third party content provider;
   obtain code to produce content associated with the one or more tags; and
   incorporate the code to produce content associated with the one or more tags into a template associated with the page to generate one of the plurality of at least partially pre-rendered pages.

10. The system of claim 1, wherein the processor is further configured to:
    determine the one or more tags included in a page associated with the identifier, wherein the one or more tags include one or more JavaScript-based calls to one or more remote servers, wherein one of the remote servers is a third party verification provider;
    obtain code to produce content associated with the one or more tags; and
    incorporate the code to produce content associated with the one or more tags into a template associated with the page to generate one of the plurality of at least partially pre-rendered pages.

11. The system of claim 1, wherein the processor is further configured to:
    analyze the one or more tags included in a page associated with the identifier;
    determine a set of extra tags of the one or more tags;
    remove the set of extra tags from a template associated with the page; and
    generate the plurality of at least partially pre-rendered pages based on the template associated with the page.

12. The system of claim 1, wherein the processor is further configured to generate one of the plurality of at least partially pre-rendered pages that corresponds to the identifier at least in part by:
    determine the one or more tags included in a page associated with the identifier, wherein the one or more tags include one or more function calls for content from one or more remote servers;
    obtain code to produce the content from the one or more remote servers; and
    insert into a template associated with the page the code to produce the content from the one or more remote servers in place of the one or more tags to generate the one of the plurality at least partially pre-rendered pages.

13. The system of claim 1, wherein the processor is further configured to provide an indication to a third party verification provider, wherein the indication indicates that one of the plurality of at least partially pre-rendered pages provided to the server includes content associated with a particular content provider.

14. The system of claim 1, wherein one of the plurality of at least partially pre-rendered pages is retrieved based at least in part one of an IP address associated with a client device, location data associated with the client device, a time of day, a device identifier (ID) associated with the client device, and/or a cookie associated with the client device.

15. The system of claim 1, wherein the processor is further configured to:
    communicate with the content provider;
    determine whether the content element associated with the content provider is updated; and
    update one of the plurality of at least partially pre-rendered pages.

16. A method, comprising:
    receiving an identifier from a server associated with a content provider;
    generating a plurality of at least partially pre-rendered pages that correspond to the identifier, wherein each of the plurality of the at least partially pre-rendered pages is associated with a corresponding target demographic, wherein the at least partially pre-rendered page include a corresponding content element associated with the content provider and at least one third party element, wherein the at least partially pre-rendered pages incorporate corresponding code to produce content associated with the at least one third party element in place of one or more tags associated with the at least one third party element and
    providing one of the at least partially pre-rendered pages corresponding to the target demographic associated with a client device to the server, wherein the one of the at least partially pre-rendered pages is configured to incorporate code to produce content associated with the at least one third party for the target demographic associated with the client device.

17. The method of claim 16, wherein generating the plurality of at least partially pre-rendered pages includes generating the plurality of at least partially pre-rendered pages in response to the request or retrieving one of the at least partially pre-rendered pages from a database.

18. The method of claim 16, further comprising:
    determining the one or more tags included in a page associated with the identifier;

obtaining code to produce content associated with the one or more tags; and incorporating the code to produce content associated with the one or more tags into a template associated with the page to generate one of the at least partially pre-rendered pages.

19. A non-transitory computer readable storage medium comprising computer instructions, when executed by a processor, causes the processor to perform the steps of:

receiving an identifier from a server associated with a content provider;

generating a plurality of at least partially pre-rendered pages that correspond to the identifier, wherein each of the plurality of the at least partially pre-rendered pages is associated with a corresponding target demographic, wherein the at least partially pre-rendered pages include a corresponding content element associated with the content provider and at least one third party element, wherein the at least partially pre-rendered pages incorporate corresponding code to produce content associated with the at least one third party element in place of one or more tags associated with the at least one third party element and providing one of the at least partially pre-rendered pages corresponding to the target demographic associated with a client device to the server, wherein the one of the at least partially pre-rendered pages is configured to incorporate code to produce content associated with the at least one third party for the target demographic associated with the client device.

* * * * *

UNITED STATES PATENT AND TRADEMARK OFFICE
CERTIFICATE OF CORRECTION

PATENT NO. : 10,726,077 B1  
APPLICATION NO. : 15/425801  
DATED : July 28, 2020  
INVENTOR(S) : Justin Yoo Choi Page 1 of 1

It is certified that error appears in the above-identified patent and that said Letters Patent is hereby corrected as shown below:

In the Specification

In Column 10, Line(s) 60, after "then", delete "then" and insert --the--, therefor.

Signed and Sealed this  
Eighth Day of December, 2020

Andrei Iancu  
*Director of the United States Patent and Trademark Office*